United States Patent
Hecker

(10) Patent No.: US 8,692,706 B2
(45) Date of Patent: Apr. 8, 2014

(54) SENSOR DEVICE FOR MEASURING THE COMPRESSION TRAVEL AND/OR THE COMPRESSION RATE OF WHEELS AND/OR AXLES OF VEHICLES

(75) Inventor: Falk Hecker, Markgröningen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 347 days.

(21) Appl. No.: 11/885,103

(22) PCT Filed: Feb. 24, 2006

(86) PCT No.: PCT/EP2006/001719
§ 371 (c)(1),
(2), (4) Date: Sep. 23, 2008

(87) PCT Pub. No.: WO2006/089775
PCT Pub. Date: Aug. 31, 2006

(65) Prior Publication Data
US 2009/0021720 A1    Jan. 22, 2009

(30) Foreign Application Priority Data
Feb. 24, 2005   (DE) .................. 10 2005 008 403

(51) Int. Cl.
| | |
|---|---|
| *G01S 13/88* | (2006.01) |
| *G01S 7/40* | (2006.01) |
| *B60G 17/019* | (2006.01) |
| *G01S 13/00* | (2006.01) |
| *G01S 7/00* | (2006.01) |
| *B60G 17/00* | (2006.01) |

(52) U.S. Cl.
USPC .................. 342/70; 342/118; 701/1; 701/36; 367/87; 367/117; 280/5.5; 702/1; 702/33; 702/41; 702/42; 702/43

(58) Field of Classification Search
USPC ...................... 342/27, 28, 52–54, 59, 70–72, 342/104–115, 165–175, 195, 42, 50, 118, 342/127, 128–133; 701/1, 36–40; 367/87, 367/89–91, 93–96, 117; 280/5.5, 280/5.513–5.519; 702/1, 33, 41–44; 73/146, 146.2–146.5; 340/425.5, 438, 340/442, 445, 447, 448; 356/237.1, 237.2
See application file for complete search history.

(56) References Cited

U.S. PATENT DOCUMENTS 3,588,815 A * 6/1971 Koonce .................... 340/447
3,701,568 A * 10/1972 Lewis et al. ............... 342/71
(Continued)

FOREIGN PATENT DOCUMENTS

DE   33 15 594   10/1984
DE   34 23 602   1/1986
(Continued)

OTHER PUBLICATIONS

International Search Report, Apr. 28, 2006, from International Patent Application No. PCT/EP2006/001719, filed Feb. 24, 2006.
(Continued)

*Primary Examiner* — Bernarr Gregory
(74) *Attorney, Agent, or Firm* — Kenyon & Kenyon LLP

(57) ABSTRACT

A sensor device for measuring the compression travel and/or the compression rate of wheels and/or axles of vehicles, in particular of commercial vehicles, may include at least one sensor measuring in a contactless manner. The sensor device may include a radar and/or high-frequency sensor generating a beam, which is emitted and received after reflection at a reference and reflection surface.

5 Claims, 2 Drawing Sheets

(56) References Cited

U.S. PATENT DOCUMENTS

| | | | |
|---|---|---|---|
| 3,717,030 A * | 2/1973 | McGhee et al. ............. 73/146.3 |
| 3,911,434 A * | 10/1975 | Cook ............................. 342/50 |
| 4,074,227 A * | 2/1978 | Kalmus ........................ 340/447 |
| 4,290,044 A | 9/1981 | Ishikawa et al. |
| 4,300,119 A * | 11/1981 | Wiernicki ..................... 340/447 |
| 4,349,735 A | 9/1982 | Maeda |
| 4,363,020 A * | 12/1982 | Venema ........................ 340/447 |
| 4,376,931 A * | 3/1983 | Komatu et al. ............... 340/447 |
| 4,450,431 A * | 5/1984 | Hochstein ..................... 340/447 |
| 4,588,978 A * | 5/1986 | Allen ............................ 340/448 |
| 4,722,547 A * | 2/1988 | Kishi et al. ..................... 367/96 |
| 5,006,844 A * | 4/1991 | Ohta et al. .................... 340/448 |
| 5,061,932 A * | 10/1991 | Tribe et al. ..................... 342/70 |
| 5,075,855 A * | 12/1991 | Sugasawa et al. ............. 701/37 |
| 5,291,406 A * | 3/1994 | Williams et al. ............... 701/37 |
| 5,371,718 A * | 12/1994 | Ikeda et al. .................... 342/70 |
| 5,479,171 A * | 12/1995 | Schuermann .................. 342/50 |
| 5,505,080 A * | 4/1996 | McGhee ...................... 73/146.5 |
| 5,696,515 A | 12/1997 | Zyren et al. |
| 5,774,047 A * | 6/1998 | Hensel, IV ..................... 340/442 |
| 6,000,703 A | 12/1999 | Schubert et al. |
| 6,043,774 A * | 3/2000 | Singh et al. ................... 342/127 |
| 6,318,524 B1 | 11/2001 | Luz et al. |
| 6,445,338 B1 * | 9/2002 | Ohkubo ....................... 342/104 |
| 6,736,004 B2 * | 5/2004 | Evans et al. .................... 73/146 |
| 6,763,288 B2 * | 7/2004 | Caretta et al. ................... 701/1 |
| 6,774,778 B2 * | 8/2004 | Lin ............................... 340/447 |
| 6,967,590 B2 * | 11/2005 | Mancosu et al. ............. 340/442 |
| 7,026,977 B2 * | 4/2006 | Reindl ............................ 342/71 |
| 7,119,896 B2 * | 10/2006 | Godeau et al. ............. 356/237.2 |
| 7,161,476 B2 * | 1/2007 | Hardman et al. ............. 340/442 |
| 7,206,702 B2 * | 4/2007 | Isono et al. ..................... 702/41 |
| 7,515,037 B2 * | 4/2009 | Iijima ........................... 340/442 |
| 7,603,247 B2 * | 10/2009 | Isono et al. ..................... 702/41 |
| 2004/0168512 A1 | 9/2004 | McEwan |
| 2004/0231776 A1 * | 11/2004 | Skoff ........................... 340/442 |

FOREIGN PATENT DOCUMENTS

| | | |
|---|---|---|
| DE | 197 10 311 | 9/1998 |
| DE | 100 25 631 | 12/2001 |
| EP | 0 924 115 | 9/2002 |
| EP | 1 522 431 A2 | 4/2005 |
| JP | 54-142734 | 11/1979 |

OTHER PUBLICATIONS

Translation of International Preliminary Report on Patentability from International Patent Application No. PCT/EP2006/001719, Sep. 11, 2007.

Translation of Written Opinion of the International Searching Authority from International Patent Application No. PCT/EP2006/001719, Apr. 28, 2006.

* cited by examiner

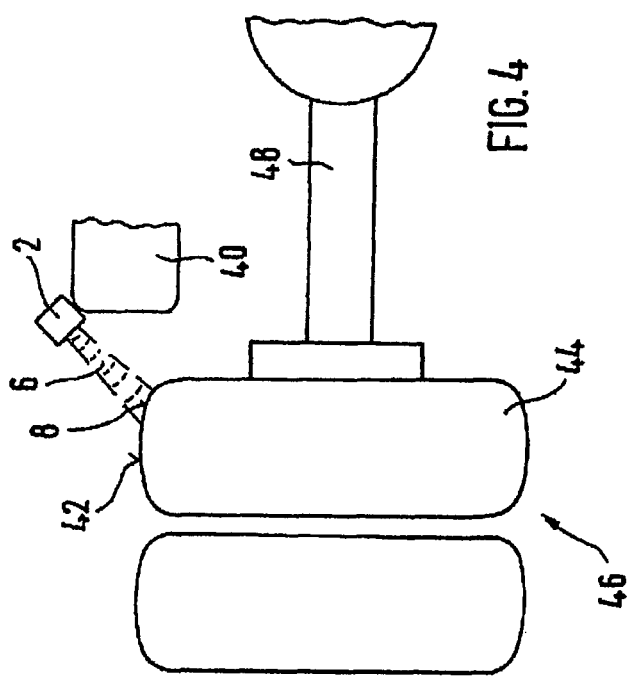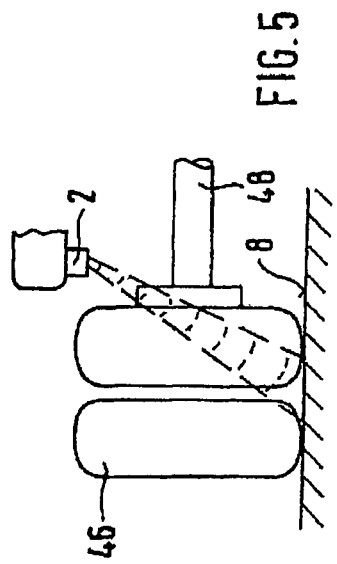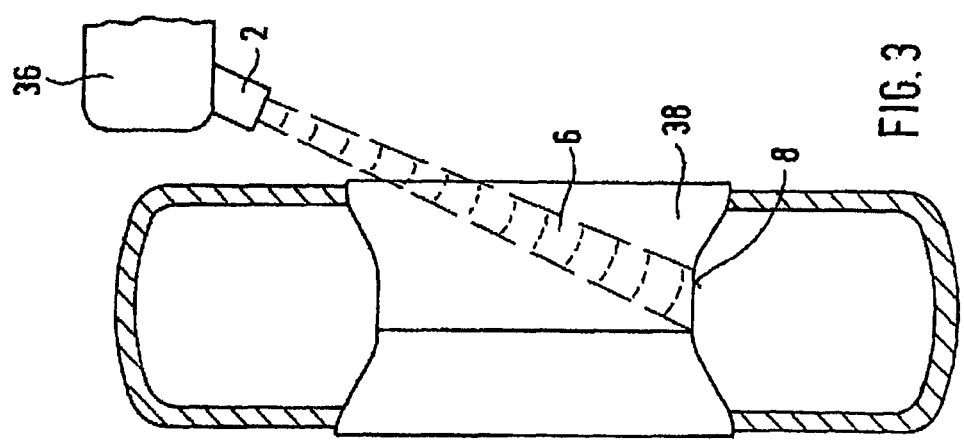

ion, the wheel sensor may be assigned to the frame or the
SENSOR DEVICE FOR MEASURING THE COMPRESSION TRAVEL AND/OR THE COMPRESSION RATE OF WHEELS AND/OR AXLES OF VEHICLES

FIELD OF THE INVENTION

The present invention relates to a sensor device for measuring the compression travel and/or the compression rate of wheels and/or axles of vehicles, in particular of commercial vehicles, the sensor device including at least one sensor measuring in a contactless manner.

BACKGROUND INFORMATION

Electronic vehicle systems require the compression travel of individual axles or wheels as a measured variable. Among such systems are, in particular, systems for automatic level control in the case of pneumatically suspended vehicles.

Conventional sensor devices convert the compression travel into a rotary motion by means of a lever-type mechanism, and the angle of rotation is measured with the aid of angular-position sensors such as rotary potentiometers. A disadvantage of these systems lies in the often delicate lever-type mechanism, which can be damaged by falling rocks, for instance. Loss of the automatic-level control means a total failure of the vehicle and entails high breakdown costs, in particular if commercially utilized vehicles are involved.

To remedy these disadvantages, the related art therefore also suggests generic contactless sensor devices operating according to the ultrasonic principle. Here, it has shown to be disadvantageous that the measuring accuracy of ultrasonic sensors is heavily dependent upon environmental conditions such as the outside temperature, the ambient pressure, as well as the degree of soiling of the sensor surfaces.

SUMMARY OF THE INVENTION

Example embodiments of the present invention provide a sensor device of the type mentioned in the introduction, developed in such a way that the aforementioned disadvantages are avoided.

In an example embodiment of the present invention, a radar or high-frequency sensor (referred to herein as a radar sensor) may form the sensor of the sensor device. The measuring principle known per se is based on a measurement of the propagation or the propagation speed of an electromagnetic beam emitted by a transmitter of the sensor, which is reflected at a reference or reflection surface and recorded by a receiver of the sensor. In an electronic evaluation unit, the beams reflected by the reference or reflection surface may be analyzed with regard to propagation time, Doppler shift, and amplitude ratio, and the instantaneous compression travel, the compression or decompression rate, and possibly also the angular position may be calculated therefrom. It may be particularly advantageous for the sensor to be situated on the undercarriage or the frame of the vehicle, and the reference or reflection surface to be situated on the element compressing with respect to the undercarriage or the frame, or vice versa.

Such radar sensors may be characterized by a relatively high imperviousness to environmental conditions such as, for instance, temperature or pressure changes and decontamination. Furthermore, radar technology which are already in use in commercial vehicles in ACC systems (adaptive cruise control), which measure the distance of a vehicle with respect to a vehicle driving in front in a contactless manner, may be implemented so that the sensors may be relatively cost-effective.

In an example embodiment of the present invention, the radar sensor may be assigned to the frame or the undercarriage of the vehicle, and the reference or reflection surface may be assigned to an axle of the vehicle. Conversely, however, it is also possible for the radar sensor to be assigned to the axle of the vehicle, and the reference or reflection surface to be assigned to the frame or the undercarriage of the vehicle.

In one example variant of this embodiment, the radar sensor may be assigned to the frame or the undercarriage of the vehicle, and the reference or reflection surface to an axle link, or vice versa. Since axle links are normally tilted during compression and decompression motions of the axle, they also locally vary their distance with respect to the frame, the distance being proportional to the compression travel.

In another example variant of this embodiment, the radar sensor may be disposed inside or on a housing of a level control valve fixedly mounted on the frame or undercarriage of an air suspension system. A portion of an outer surface of a housing, lying opposite the sensor, of a differential gear which is fixed in place on the axle may form the reference or reflection surface. This not only saves space but may also dispense with the necessity of providing a separate receptacle for the wheel sensor on the frame.

In an alternative example embodiment of the present invention, the wheel sensor may be assigned to the frame or the undercarriage of the vehicle, and the reference or reflection surface may be assigned to a tire of a wheel of the vehicle. In an example modification of this embodiment, it may also be provided that the radar sensor is assigned to the frame or the undercarriage of the vehicle, and the reference or reflection surface is assigned to a wheel rim surface of a wheel rim of the vehicle.

In an example embodiment of the present invention, at least a portion of the radar sensor may be disposed within an air-suspension bellows of an air suspension element fixedly mounted on the frame or undercarriage, and the reference or reflection surface may be formed by a compressing surface of the air suspension bellows pointing to the interior of the air suspension bellows. This may have the advantage that the air suspension bellows provide special protection against contamination to both the sensor and the reference or reflection surface.

In another example embodiment of the present invention, a radar sensor may be fixedly mounted on the frame or undercarriage, to which the road surface, preferably in front of or behind a wheel, is assigned as reference or reflection surface.

In an example embodiment of the present invention, at least a portion of the radar sensor may be situated within a vibration damper of the vehicle, and the reference or reflection surface be formed by a piston surface of a damper piston.

The configuration of the sensor device according to the present invention is clarified by the following description of a plurality of exemplary embodiments.

BRIEF DESCRIPTION OF THE DRAWINGS

FIG. 3 is a diagram that shows a sensor device in which a radar sensor is assigned to an elongated frame of a vehicle and a reference or reflection surface is assigned to a radially inner wheel rim surface of a wheel rim, according to an example embodiment of the present invention.

FIG. 4 is a diagram that shows a sensor device in which a radar sensor is assigned to an elongated frame of a vehicle and a reference or reflection surface is formed by a tread of an inner tire on one side of a driven rigid axle, according to an example embodiment of the present invention.

FIG. 5 is a diagram that shows a sensor device in which a radar sensor is mounted on a frame or undercarriage of a vehicle and a road surface is assigned as a reference or reflection surface, according to an example embodiment of the present invention.

DETAILED DESCRIPTION OF THE INVENTION

Figure 1:
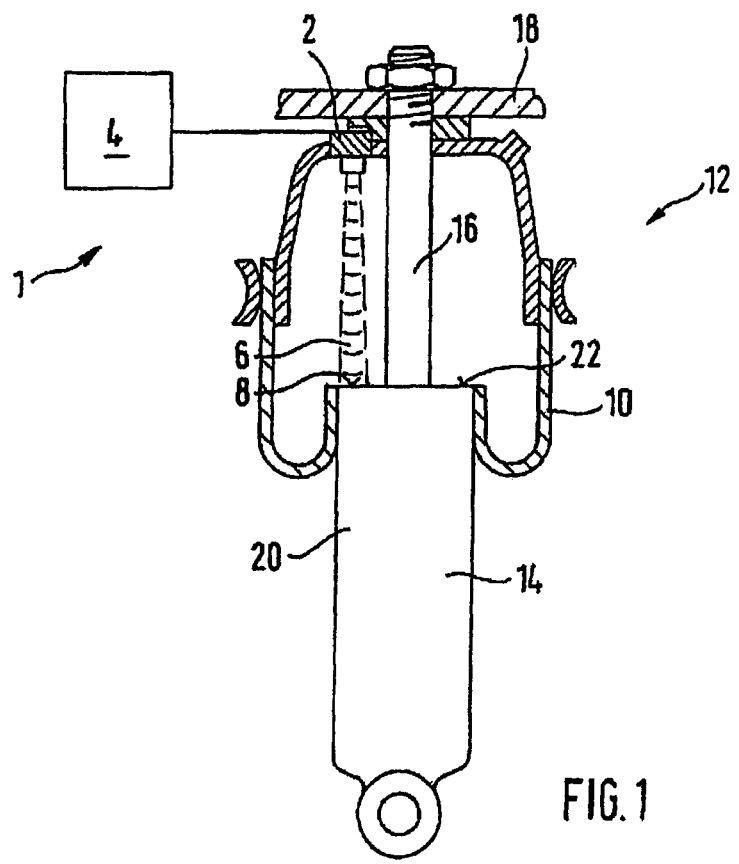
FIG. 1 is a diagram that shows a sensor device in which a radar sensor is disposed within an air suspension bellows and a reference or reflection surface is formed by a head plate of a head plate of a damper body, according to an example embodiment of the present invention.

The sensor device, overall denoted by 1 in FIG. 1, may be utilized to measure the compression travel and/or the compression rate of wheels and/or axles of commercial vehicles, and, according to an example embodiment of the present invention, may include a radar sensor 2 known per se from, for instance, the Kraftfahrtechnisches Handbuch (Automotive Handbook) of Robert Bosch GmbH, 24th edition, p. 141/142. The sensor device 1 may also include a microcomputer-based, electronic evaluation device 4.

The measuring principle may be based on the propagation time measurement or propagation-speed measurement of an electromagnetic radar beam 6 emitted by a transmitter of radar sensor 2, which may be reflected at a reference or reflection surface 8 of a compressing or decompressing element and recorded by a receiver of radar sensor 2. Radar beams 6 reflected by reference or reflection surface 8 may be analyzed in evaluation device 4 with regard to propagation time, Doppler shift and amplitude ratio, and the instantaneous compression travel. The compression or decompression rate and possibly also the angular position may then be calculated therefrom. Radar sensor 2 may be situated on the undercarriage or the frame of the commercial vehicle, and reference or reflection surface 8 may be situated on the element compressing with respect to the undercarriage or the frame, or vice versa.

Radar sensor 2 may have a working frequency of 76 . . . 77 GHz (wavelength approx. 3.8 mm), which permits the compact structure required for automotive applications. A Gunn oscillator (Gunn diode in cavity resonator) may feed in parallel three adjacently placed patch antennas as transmitters, which may also serve as receivers of the reflected signals. A plastic lens (Fresnel) set in front may focus the transmitted beam. Due to the lateral offset of the antennas, their receiving characteristic (6 dB width 4°) may point in different directions. In addition to the distance of the compressing element from the frame of the commercial vehicle and the compression rate, it may also be possible to determine the direction at which they are detected. Directional couplers may separate transmitted and received reflection signals. Three post-connected mixers may transpose the receive frequency down to virtually zero by admixing the transmit frequency (0 . . . 300 kHz). The low-frequency signals may be digitized for further evaluation and subjected to a high-speed Fourier analysis to determine the frequency.

The frequency of the Gunn oscillator may be continuously compared to that of a stable reference oscillator DRO (dielectric resonance oscillator) and regulated to a specified setpoint value. In so doing, the supply voltage to the Gunn diode may be modulated until it corresponds to the setpoint value again. For measurement purposes, the Gunn oscillator frequency may be briefly increased and reduced by 300 MHz every 100 ms in a saw-tooth-pattern (FMCW—frequency modulated continuous wave). The signal reflected at the compressing element or on the frame may be delayed according to the propagation time (i.e., in the rising slope by a lower frequency, in the falling slope by a frequency higher by the same amount). The frequency differential $\Delta f$ may be a direct measure of the distance (for instance, 2 kHz/m). However, if there is additionally a certain relative or compression rate between the frame and the compressing element, then receive frequency $f_e$ may be increased by a specific proportional amount $\Delta f_d$ on account of the Doppler effect in both the rising and the falling slopes (e.g., 512 Hz per m/s), i.e., two different differential frequencies $\Delta f_1$, and $\Delta f_2$ may result. Their addition may produce the distance, and their difference may produce the compression rate of the compressing element relative to the frame.

According to an example embodiment of the present invention, at least a portion of radar sensor 2 may be disposed within an air suspension bellows 10, accommodating a gas volume of an air suspension element 12, which is combined with a vibration damper 14 projecting into air suspension bellows 10 via a piston rod 16, piston rod 16 being retained at one end on a shock-absorber receptacle on frame 18 of the commercial vehicle. On the other side, piston rod 16 may project into damper body 20 disposed outside of air suspension bellows 10 in that, guided through a feed-through opening of head plate 22 of damper body 20, it supports a piston (not visible in FIG. 1), which is guided inside damper body 20 and cooperates with the damping medium. Reference or reflection surface 8 for radar beam 6, which preferably propagates parallel to the piston rod, may be preferably formed by head plate 22 of damper body 20. As an alternative, any other compressing surface pointing toward the interior of air suspension bellows 10, such as a surface of the piston, may be used as reference or reflection surface 8 for radar beam 6. In the case of air suspension bellows 10 configured without integrated vibration damper 14, reference or reflection surface 8 may also be formed on an air suspension piston that will then be provided.

Figure 2:
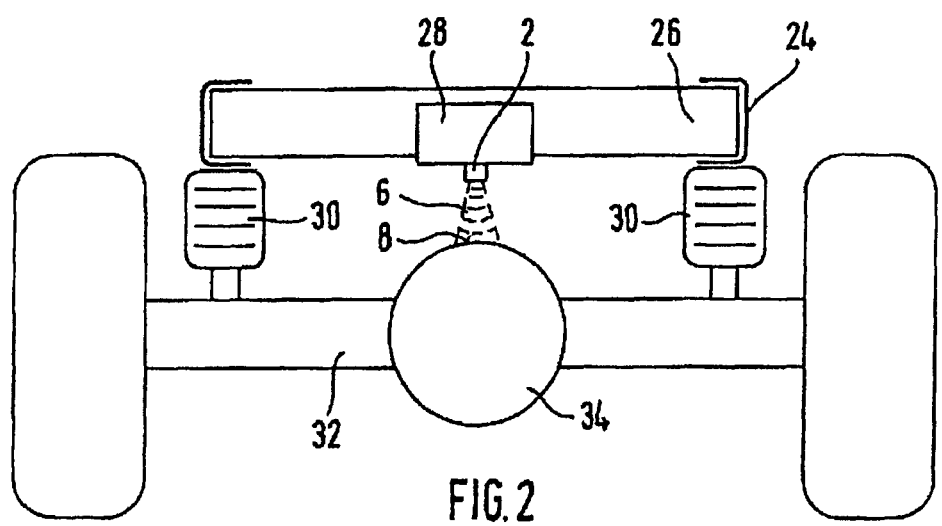
FIG. 2 is a diagram that shows a sensor device in which a radar sensor in integrated into a housing of a level control valve of an air suspension device and a portion of an outer surface of a housing of a differential gear forms a reference or reflection surface, according to an example embodiment of the present invention.

According to another example embodiment of the present invention, as shown in FIG. 2, radar sensor 2 may be integrated into the housing of a level control valve 28 of an air suspension device of the commercial vehicle. Level control valve 28 may be centrally disposed on a crosspiece 26 that connects two longitudinal frame supports 24 to each other, the housing lying across from a housing of a differential gear 34 supported by a driven rigid axle 32 suspended by air suspension bellows 30. In this case, a portion of the outer surface of the housing of differential gear 34, lying across from radar sensor 2, may form reference or reflection surface 8 for radar beam 6, which propagates perpendicular to rigid axle 32.

In example embodiment of the present invention, as shown in FIG. 3, radar sensor 2 may be assigned to the frame, or more precisely, to elongated frame element 36 of the commercial vehicle, and reference or reflection surface 8 may be preferably assigned to a radially inner wheel rim surface of a wheel rim 38, radar beam 6 having an oblique alignment.

FIG. 4 shows one example in which radar sensor 2 is once again affixed on the frame, or more precisely, on elongated frame element 40, of the commercial vehicle, and reference or reflection surface 8 is formed by tread 42 of an inner tire 44 of a twin tire 46 on one side of a driven rigid axle 48. Analogously, it is also possible to measure the compression travel and the compression rate of the twin tire on the other side of the axle by its own radar sensor 2.

The present invention is not limited to the mentioned exemplary embodiments. Instead, any application is conceivable in which radar sensor 2 is assigned to the frame or the undercarriage of the vehicle, and reference or reflection surface 8 is assigned to a compressing element of the vehicle, or vice versa.

For example, the example embodiment according to FIG. 1 could be modified in such a way that at least a portion of radar sensor 2 is disposed within vibration damper 14 of the vehicle, and reference or reflection surface 8 is formed by a piston surface of the damper piston. In the same way, the example embodiment according to FIG. 2 could be modified such that radar sensor 2 is assigned to the frame or the undercarriage of the vehicle, and reference or reflection surface 8 is assigned to an axle link of rigid axle 32, or vice versa.

In an example embodiment of the present invention, as shown in FIG. 5, a radar sensor 2 may be fixedly mounted on the frame or undercarriage, and the road surface, preferably in front of or behind a wheel 46, may be assigned as reference or reflection surface 8.

What is claimed is:

1. A sensor device for measuring a compression parameter of at least one of wheels and axles of vehicles relative to one of a frame and an undercarriage of the vehicles, comprising:
at least one contactlessly measuring sensor arrangement including a high-frequency sensor, the at least one contactlessly measuring sensor generating a beam which is emitted and received after reflection at one of a reference and reflection surface;
wherein:
the one of the frame and the undercarriage is of an air suspension device of the vehicle,
the high-frequency sensor is situated one of in and on a housing of a level control valve which is fixedly mounted on the one of the frame and the undercarriage, and
the one of the reference and reflection surface is formed by a portion of an outer surface of a housing of a differential gear which lies across from the at least one of a radar sensor and the high-frequency sensor and which is fixed in place on the axle.

2. The sensor device of claim 1, wherein an axle of the vehicle one of constitutes and includes the compressing element.

3. The sensor device of claim 2, wherein the compressing element is an axle link.

4. The sensor device of claim 1, wherein the sensor device is for measuring the at least one of the compression parameter of the at least one of wheels and axles of commercial vehicles.

5. The sensor device of claim 1, wherein the high-frequency sensor is a radar sensor.

\* \* \* \* \*

UNITED STATES PATENT AND TRADEMARK OFFICE
CERTIFICATE OF CORRECTION

PATENT NO. : 8,692,706 B2  
APPLICATION NO. : 11/885103  
DATED : April 8, 2014  
INVENTOR(S) : Falk Hecker Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 838 days.

Signed and Sealed this
Twenty-ninth Day of September, 2015

Michelle K. Lee
*Director of the United States Patent and Trademark Office*